May 31, 1960  E. J. JUSTUS  2,939,062
MOTOR CONTROL FOR PAPER MACHINE DRIVE ARRANGEMENT
Filed May 24, 1956  3 Sheets-Sheet 1

Inventor
EDGAR J. JUSTUS
by Hill, Sherman, Meroni, Gross + Simpson
Attys.

May 31, 1960 — E. J. JUSTUS — 2,939,062
MOTOR CONTROL FOR PAPER MACHINE DRIVE ARRANGEMENT
Filed May 24, 1956 — 3 Sheets-Sheet 2
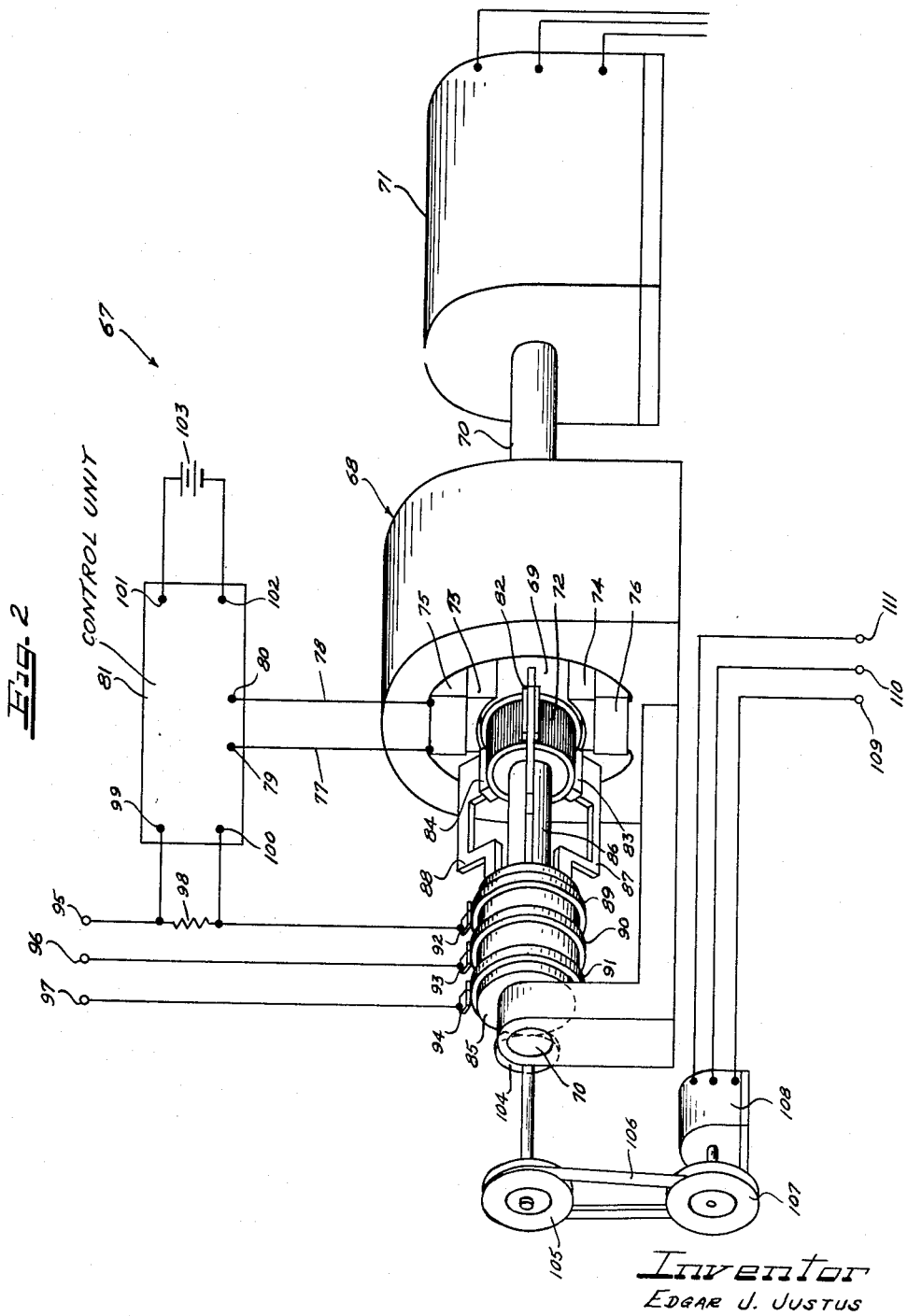
Inventor
EDGAR J. JUSTUS

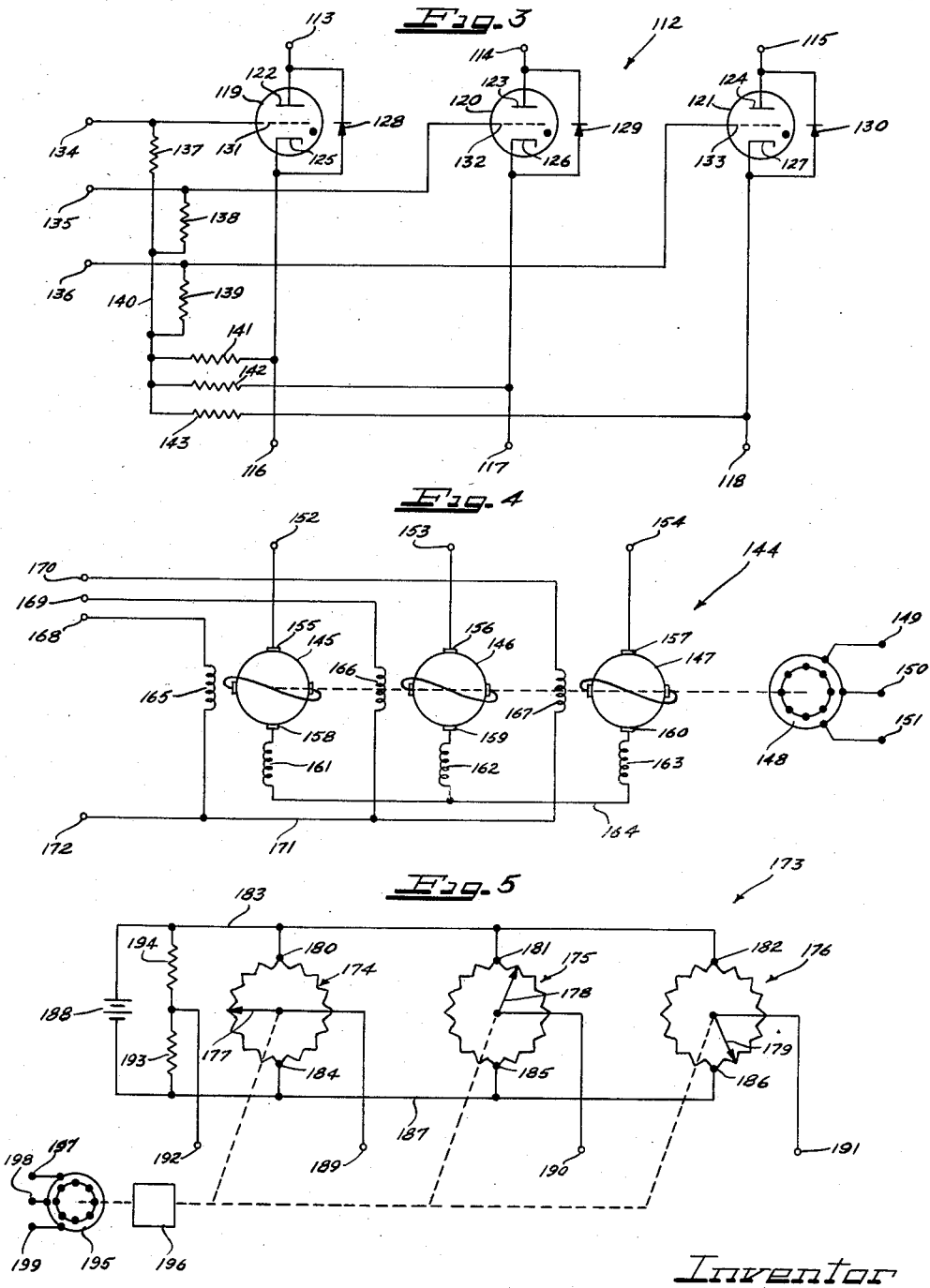

United States Patent Office 2,939,062
Patented May 31, 1960

2,939,062

MOTOR CONTROL FOR PAPER MACHINE DRIVE ARRANGEMENT

Edgar J. Justus, Beloit, Wis., assignor to Beloit Iron Works, Beloit, Wis., a corporation of Wisconsin Filed May 24, 1956, Ser. No. 586,989

5 Claims. (Cl. 318—44)

This invention particularly relates to the drive of the rolls of a paper making machine, although many features of the invention have general application. In a paper making machine, a web of paper is formed on a screen or wire, transferred to a pick-up felt and thence successively to press and dryer felts or sections of the machine. There is generally an open draw between at least some of the felts or sections and to maintain proper tension in the open draw of the web, it is necessary to maintain a slight speed differential between the felts or sections. Slight variations in the differential of speed may cause great variations in the slack or tension of the web to cause corresponding variations in the thickness and quality of the paper.

It is therefore necessary that the drive speed of the rolls be controlled with great accuracy. It is also desirable that the relative speeds of the rolls be readily adjusted to obtain optimum operation. In addition, it is desirable to be able to simultaneously decrease or increase the speed of the rolls of the entire machine while maintaining the optimum speed differential or ratio between rolls. Further, it is desirable that the drive means be readily and economically constructed and operated and reliable in operation.

A variety of mechanical and electrical drive systems have heretofore been used or proposed but such systems have been lacking in one or more of the above-enumerated desirable features, and this invention was evolved with the object of providing a drive system having such features.

The drive means of this invention comprises an electric motor having similarly phased rotor and stator windings. If such windings are connected to separate sources of current, the synchronous speed of operation of the motor will be equal to the sum or difference of the frequencies of the two sources multiplied by a factor dependent upon the number of poles. Thus the speed of rotation of the motor may be controlled by varying the frequency of only one of the current sources. In the drive of this invention, accordingly, the rotor and stator windings of a motor are connected to separate current sources with the frequency of one source being adjusted to vary the speed of operation of the motor.

It is important that with this arrangement, the motor is operated as a synchronous motor and changes in load or torque, even transient changes, change only the phase angle between the rotor and stator and do not cause any change in speed whatsoever.

It is usually desirable that the power requirements of the adjustable frequency source be as small as possible. In general, the power supplied by each source will be proportional to a fixed quantity (excitation) plus or minus a quantity equal to the power output multiplied by the frequency of the source and divided by the sum or difference of the frequencies of the two sources.

For example, with a three-phase two-pole motor (two poles per phase) and with a 60 cycle current applied to the stator windings and a direct current applied to the rotor windings, the motor will operate as an ordinary synchronous motor at a speed of 3600 r.p.m. The direct current source will supply only excitation and the 60 cycle source will supply the output power plus losses. If, instead of the direct current, a 6 cycle current is applied to the rotor winding, the motor will operate either at 3960 r.p.m. (3600 plus 360) or 3240 r.p.m. (3600 minus 360). If the motor operates at 3960, the power supplied by the 6 cycle source will be increased by a factor proportional to the mechanical power output multiplied by 6 and divided by 6 plus 60. If the motor operates at 3240, the power supplied to the rotor will be decreased by a factor proportional to the power output multiplied by 6 and divided by 60 minus 6. It will be apparent that the low frequency source may supply a negative power, indicating that power is transferred thereto rather than supplied therefrom. This may be visualized by considering the motor to be operating as an induction motor which, of course, operates at less than synchronous speed. In an induction motor, the power generated in the rotor is dissipated either in the resistance of the rotor winding or in an external resistance. Instead of being so dissipated, the power may be transferred to a low frequency "source."

From the above, it will be apparent that the power requirements (either of supply or absorption) of the adjustable frequency source will be at a minimum when the mid-frequency of its range of operation is small compared to the frequency of the other source with operation of the adjustable frequency source at such mid-frequency being effective to decrease the motor speed from that obtained with direct current excitation.

In the paper making machine drive system of this invention, a plurality of motors are arranged to drive separate rolls. One winding of each motor is connected to a source of current which supplies the main driving power. The other winding of at least one of the motors is connected to a separate adjustable low frequency current source. The low frequency source may then be adjusted to obtain the proper speed differential between rolls. If the frequency of the main power source should increase or decrease, it will cause a simultaneous increase or decrease in the speed of all rolls, with minimum effect on the transfer of the web between sections of the machine.

A high range of speed differential is not necessary in a paper machine and in general, the maximum range of variation of frequency of the adjustable source need not exceed 10% of the frequency of the main source. Hence, the power requirements for the adjustable frequency source may be substantially less than 10% of the total power.

In addition, a 1% variation in the frequency of the adjustable frequency source will cause a 0.1% variation or less in the speed of the associated roll. Accordingly, it is possible to maintain a set differential in speed with great accuracy which is extremely important in paper making machine operation.

Other features of the invention reside in the construction of adjustable low frequency sources and the manner of connection and operation of the system. It will be appreciated that although the drive system of this invention is used to great advantage in a paper making machine, many features have general application and particularly in processing machines in which a continuous medium is passed from one roll or the like to another.

This invention contemplates other objects, features and advantages which will become more fully apparent from the following detailed description taken in conjunction with the accompanying drawings which illustrate preferred embodiments and in which:

Figure 2 is a diagrammatic illustration of a preferred form of adjustable low frequency source constructed according to the principles of this invention and usable in the system of Figure 1;

Figure 3 is a circuit diagram of another preferred form of low frequency source;

Figure 4 is a circuit diagram of still another form of low frequency source; and Figure 5 is a circuit diagram of a source of low frequency control signals usable in the circuits of Figures 3 and 4.

Figure 1:
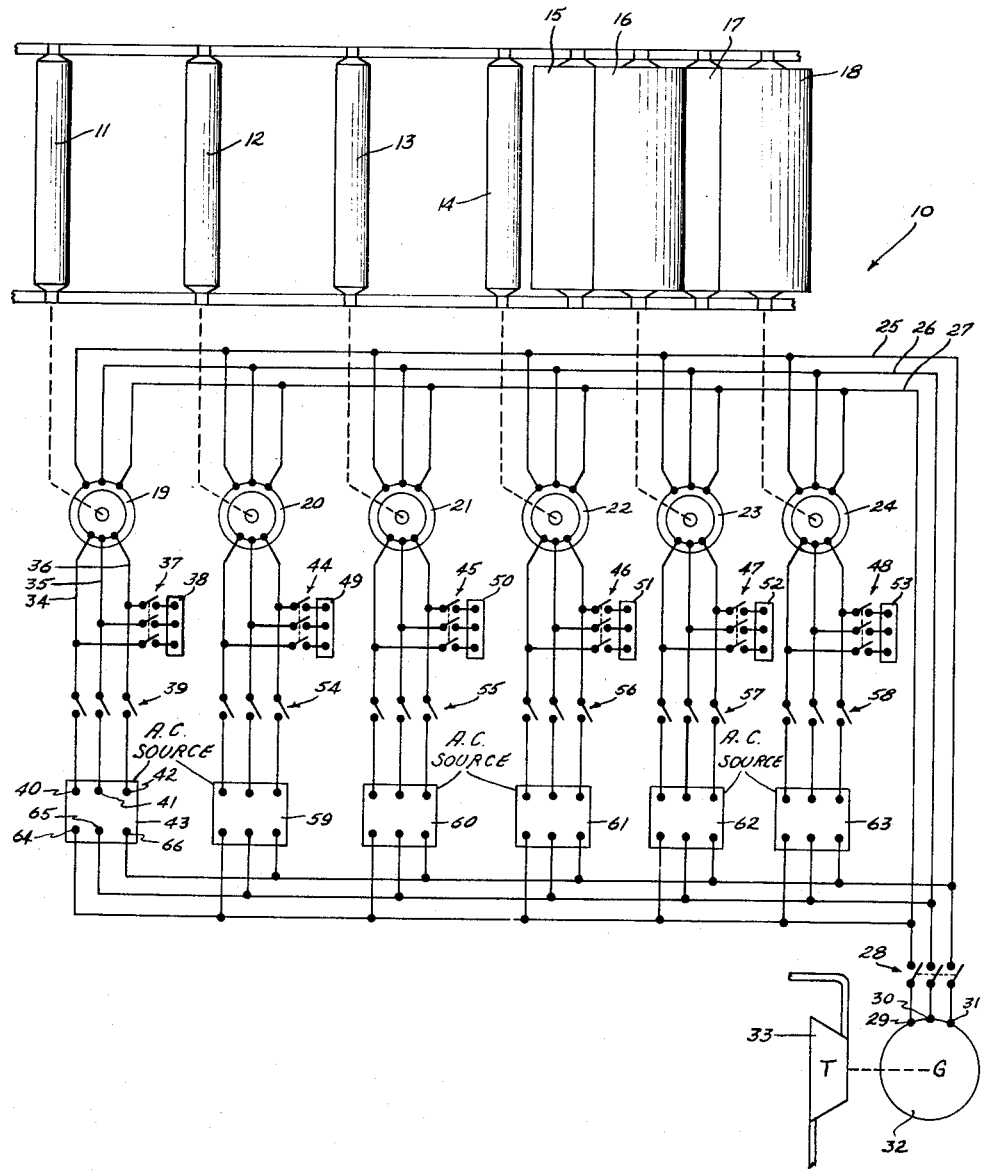
Figure 1 is a schematic diagram of a paper making machine drive system constructed according to the principles of this invention.

Reference numeral 10 generally designates a paper making machine drive system constructed according to the principles of this invention. The paper making machine to which the drive system is supplied comprises a wire support and drive section which includes a couch roll 11 as illustrated diagrammatically in Figure 1. A web of paper is formed on the wire and is transferred to a first felt supported and driven on a plurality of rolls including a first press roll 12. The web is successively transferred to second and third press sections including rolls 13 and 14, and thence to a first pair of dryer rolls 15 and 16, after which it is transferred to a second pair of dryer rolls 17 and 18. It will be understood that each of the sections will include additional rolls and, of course, several additional pairs of dryer rolls will ordinarily be provided.

The couch roll 11 and press rolls 12, 13 and 14 are respectively driven by electric motors 19, 20, 21 and 22. The first pair of dryer rolls 15 and 16 are geared together and driven by an electric motor 23 and the second pair of dryer rolls 17 and 18 are similarly driven by an electric motor 24.

Each of the motors 19—24 has similarly phased stator and rotor windings. The motors are actually operated as synchronous motors but the ordinary three-phase synchronous motor does not have phase-wound rotor or secondary windings, and it is desirable to use three-phase motors for greater efficiency and better starting characteristics. Three-phase motors are generally available which have phase-wound rotor windings, such being usually operated as induction motors with external resistances being connected to the rotor windings through slip rings for starting and speed control. The motors 19—24 may therefore be of the type referred to in the art as three-phase induction motors with phase-wound rotor or secondary windings, although they are operated as synchronous motors.

One winding of each of the motors 19—24, preferably the stator winding, is connected to supply lines 25, 26 and 27 which are connected through a contactor 28 to terminals 29, 30 and 31 of a three-phase generator 32. The generator 32 is driven by a suitable source of motive power such as a steam turbine 33.

The rotor winding of the motor 19 is connected to lines 34, 35 and 36 which may be connected through a contactor 37 to a starting control unit 38 which may be a conventional type having adjustable resistances. The lines 34, 35 and 36 are also connected through a contactor 39 to terminals 40, 41 and 42 of an adjustable low frequency current source 43.

The rotor windings of the motors 20—24 are similarly connectible through contactors 44—48 to starting devices 49—53, and through contactors 54—58 to adjustable low frequency current sources 59—63.

In operation, the generator 32 is driven by the turbine 33, preferably at a speed which is reduced with respect to the normal operating speed. The contactor 28 may be closed to energize the stator windings of the motors 19—24. The motors 19—24 may then be started and brought up to speeds somewhat below the speed of generator 32 by closing the contactors 37 and 44—48 and controlling the devices 38 and 49—53.

The motors 19—24 will now be operating as induction motors and voltages will be developed in the rotor windings having a frequency proportional to the amount of slip. Assuming that some resistance is left in the starting device 38, for example, voltages having low frequency components will be developed between the lines 34, 35 and 36. The low frequency source 43 may then be adjusted until its output has the proper frequency, phase and voltage relation to the low frequency voltages between the lines 34, 35 and 36, after which the contactor 39 may be closed to connect the source 43 to the lines 34, 35 and 36. The starting unit 38 may then be disconnected from the circuit, preferably gradually by adjustment to the maximum resistance after which the contactor 37 is opened.

The motor 19 will now operate as a synchronous motor, its speed being proportional to the difference between the frequency output of the generator 32 and the frequency output of the source 43. Increasing the frequency of the source 43 will decrease the speed of the motor 19 and decreasing the frequency will have the opposite effect.

The motors 20—24 may now be disconnected from the starting device 49—53 and connected to the low frequency sources 59—63 in a similar fashion. The sources 43 and 59—63 are then adjusted to obtain approximately the proper relative speeds and the machine is ready for the paper-making operation. After the web of paper is traveling through the machines, the sources 43 and 59—63 may be adjusted to obtain exactly the right speeds of operation and tensions in the web. As above indicated, the generator 32 may be operated at a reduced speed during the starting operation and its speed may be increased to the desired operating speed, which will simultaneously increase the speeds of all of the motors 19—24 with the effect on the speed differentials being minimized.

According to a specific feature of the invention, the source 43 has terminals 64, 65 and 66 and the sources 59—63 have similar terminals, all connected to the supply lines 25, 26 and 27. The operation of the sources is such that the low frequency output thereof is proportional to the frequency output of the generator 32. With such an arrangement, the speed differential between sections of the paper-making machine is automatically increased as the speed of operation is increased, which tends to maintain proper speed relation. In addition, because of the fact that all of the sources 43 and 59—63 have a synchronizing connection to the generator 32, the operation thereof is stabilized.

Referring to Figure 2, reference numeral 67 generally designates one preferred form of low frequency current source. The source 67 comprises a commutator type generator 68 similar to the conventional direct current motor or generator but having a special brush arrangement. In particular, the generator 68 comprises an armature 69 mounted on a shaft 70 which may be connected to a motor 71. The armature 69 may be of conventional construction with its conductors connected to a commutator 72 which may also be of conventional construction. The armature 69 rotates within a field structure comprising a pair of poles 73 and 74 with field windings 75 and 76 thereon, the field windings being connected through conductors 77 and 78 to terminals 79 and 80 of a control unit 81.

The commutator 72 is engaged by three brushes 82, 83 and 84 spaced 120° apart. The brushes 82, 83 and 84 are supported on a sleeve 85 through arms 86, 87 and 88 and are respectively connected electrically to rings 89, 90 and 91 which are supported on the sleeve 85 and are respectively engaged by stationary contacts 92, 93 and 94.

The sleeve 85 is rotatably mounted on the shaft 70, so that the brushes 82—84 may rotate relative to the field structure of the generator. The armature 69 is rotated at a relatively high speed while the brushes 82—84 are rotated at a comparatively low speed corresponding to the desired low frequency output. In operation, as the brushes are rotated slowly, voltages of alternating polarity will be developed between the brushes 82, 83, between the brushes 83, 84 and between the brushes 84, 82 which will be 120° out of phase with each other. Accordingly, a three-phase output voltage is produced at a very low frequency. It may be noted that with the brushes stationary, direct currents are generated which may be equalized as between the brushes by proper positioning thereof. In the event a single phase rather than a three-phase output is desired, a pair of diametrically opposed brushes may be used. It should also be noted that the low frequency currents could be generated with a conventional alternating current generator, but such a generator would have to be extremely large because of the low frequency of operation and, in addition, it would not be possible to generate direct current.

The stationary contacts 92, 93 and 94 are connected to terminals 95, 96 and 97 which, of course, may be connected through a contactor, such as the contactor 39 in Figure 1, to the rotor of the motor to be controlled. In some cases, it may be desirable to maintain a constant current output and for this purpose, a resistance 98 is connected in series between the contact 92 and the terminal 95 to develop a voltage proportional to current which is applied to terminals 99 and 100 of the control unit 81. The unit 81 has terminals 101 and 102 for connection to a suitable current source such as a battery 103 and may be arranged to control the current through the field windings 75 and 76 in a manner to maintain constant current output. For example, a vacuum tube might be connected with its plate-cathode circuit in series between the battery 103 and the field windings 75 and 76 and with its grid-cathode voltage controlled by the voltage between terminals 99 and 100. The unit 81 should in any case include means for manual adjustment of the field current.

To rotate the sleeve 85 and the brushes of the generator, a wheel 104 is engaged with the periphery of the sleeve 85. The wheel 104 is driven from a pulley 105 which, in turn, is driven through a belt 106 from a pulley 107 driven by a motor 108. The pulleys 105 and 107 are adjustable in a manner conventional in the art to obtain any desired drive ratio in a certain range. Thus, the pulleys 105, 107 constitute an adjustable speed drive for the generator brushes. It will be appreciated that the only power required to drive the brushes is that required to overcome friction between the brushes and the commutator, friction between the sleeve 85 and the shaft and friction between the rings and contacts. The motor 108 is preferably a three-phase synchronous motor connected to terminals 109, 110 and 111 which may be connected to supply lines such as the lines 25—27 in Figure 1, in the same manner that the terminals 64—66 of the source 43 are connected. The motor 71 may also be a three-phase motor and may be connected either to the terminals 109—111 or to a separate power source.

It should be noted that the generator 68 may be operated as a motor as well as a generator. As previously indicated, the low frequency current source may be required to absorb as well as supply power, in maintaining the proper speed of operation of the main drive motor. In that event, a drive torque may be applied to the armature 69 by virtue of the currents flowing from the brushes and if the electrical power input exceeds the losses, a mechanical drive torque may be applied to the motor 71 if the mechanical power input to the motor 71 exceeds the losses therein, the motor may operate as a generator to supply electrical energy to the supply lines. This, of course, is a very desirable feature of the low frequency source 67.

Referring to Figure 3, reference numeral 112 generally designates a further preferred form of low frequency source. In this arrangement, terminals 113, 114 and 115 are arranged to be connected to three-phase supply lines, such as the lines 25—27 in Figure 1, and terminals 116, 117 and 118 are arranged to be connected through contactors such as contactors 39 and 54—58, to the rotor windings of the motor to be controlled. Discharge devices 119, 120 and 121 are provided having plates 122, 123 and 124 respectively connected to the terminals 113, 114 and 115, and having cathodes 125, 126 and 127 respectively connected to the terminals 116, 117 and 118. Rectifier devices 128, 129 and 130 are respectively connected in parallel with the devices 119, 120 and 121 and are arranged to conduct in a direction opposite the direction of conduction of the devices 119—121.

The devices 119, 120 and 121 respectively have control grids 131, 132 and 133 connected to terminals 134, 135 and 136 and also connected through resistors 137, 138 and 139 to a neutral bus 140 which is connected through resistors 141, 142 and 143 to the terminals 116, 117 and 118.

In operation, the terminals 134, 135 and 136 are connected to a source of adjustable low frequency three-phase control voltage. Such a control voltage may be developed by means of a generator 68 such as described above, it being apparent that the generator may be very small because only very small amount of power is required. The control voltage may also be obtained from an arrangement illustrated in Figure 5, to be described, and other possible sources will suggest themselves to those skilled in the art.

If the voltage applied to the terminal 134 is at a maximum positive value, the voltages applied to the terminals 135 and 136 will at that instant be negative and of approximately equal value. The signal applied to the terminals 134—136 has a frequency much lower than the voltage applied to the terminals 113—115 so that it may be assumed that the potentials of the terminals 134—136 are substantially constant for a number of cycles of the voltage applied to the terminals 113—115. During the positive half cycles of the voltage applied to the terminal 113, the terminals 114 and 115 will be negative and the device 119 will conduct to cause current flow from the terminal 116 through the windings of the rotor of the motor to the terminals 117 and 118 and from the terminals 117 and 118 through the rectifier devices 129 and 130 to the terminals 114 and 115. As time goes on, the potential of the terminal 134 will decrease and the potential of one or the other of the terminals 135 and 136 will increase. Thus, conduction through the device 119 will decrease and at a certain time, the device 120 will start to conduct and at a later time the conduction through the devices 119 and 120 may be equal. There will then be no current flow from terminal 116 to terminal 117 but there will be equal current flows from the terminals 116 and 117 to the terminal 118. The cycle may be followed through, and it will be found that three-phase low frequency currents will be applied to the rotor windings.

It will be apparent that the circuit 112 cannot be operated in reverse in the same sense that the generator 68 can operate as a motor. However, the system 112 has the advantage that it does not require a large specially constructed generator. The devices 119, 120 and 121 (and also the devices 128—130) may be and preferably are gaseous discharge tubes capable of conducting large currents.

Referring now to Figure 4, reference numeral 144 generally designates another preferred form of low frequency three-phase current supply. The supply 144 comprises three generators 145, 146 and 147 driven by a motor 148 which may be a three-phase induction motor having its stator winding connected to terminals 149, 150 and 151 which, in turn, may be connected to the supply lines 25, 26 and 27 in the system of Figure 1.

Terminals 152, 153 and 154 may be connected to the rotor winding of a motor to be controlled, through a contactor such as one of the contactors 39 and 54—58 of the system of Figure 1. The terminals 152, 153 and 154 are respectively connected to brushes 155, 156 and 157 engaged with the commutators of the generators 145, 146 and 147. The generators 145, 146 and 147 have opposed brushes 158, 159 and 160 which are respectively connected through compensating field windings 161, 162 and 163 to a common conductor 164.

The generators 145, 146 and 147 have field windings 165, 166 and 167 which are respectively connected between terminals 168, 169 and 170 and a common conductor 171 which may be connected to a terminal 172.

In operation, a low frequency three-phase signal is applied to the terminals 168—170, the neutral, if available, being connected to the terminal 172. Such a control signal may be developed by means of a small generator similar to the generator 68 of Figure 2, by means of a system such as illustrated in Figure 5 to be described, or by such arrangements as will occur to those skilled in the art. With the three-phase control signal applied to the field windings 165—167, each of the generators will develop a single phase voltage output which, of course, are combined to produce the desired three-phase output at the terminals 152—154.

The generators 145, 146 and 147 may be conventional direct current generators, but if it is desired to minimize the output requirements of the signal source and obtain a rapid response, the generators 145, 146 and 147 may be in the form of amplidynes having an auxiliary pair of brushes in a plane at 90° to the plane of the main brushes, the auxiliary brushes being shorted together as diagrammatically illustrated in Figure 4. Such a generator will have a very high amplification factor and a rapid response.

It will be apparent that the generators 145—147 may be operated as motors as well as generators, when it is desired to absorb rather than supply low frequency three-phase power to the rotor winding of the motor being controlled. With the generators 145—147 operated as motors, the motor 148 may be operated as a generator to supply power to the supply line to which it is connected.

Referring to Figure 5, reference numeral 173 designates a circuit for developing the three-phase low frequency control signal, such as might be required for the circuits of Figures 3 and 4. The circuit 173 comprises three potentiometer units 174, 175 and 176 having continuously rotatable contacts 177, 178 and 179, terminals 180, 181 and 182 connected to a conductor 183 and terminals 184, 185 and 186 connected to a conductor 187 with a battery 188 or other direct current source being connected between the conductors 183 and 187. Each of potentiometer units has two resistance portions connected in parallel between the terminals thereof and as the contact is rotated, it travels from one terminal down one resistance portion to the other terminal and back along the other resistance portion to the initial position. It will be appreciated that as each contact is rotated, its potential with respect to either terminal of he battery will vary from 0 to a maximum value and back to 0, and, with respect to a point at the potential mid-way between the potentials of the terminals of the battery, the potential of each contact will be of alternating polarity.

The contacts 177, 178 and 179 are ganged together with a 120° displacement therebetween so that as they are rotated, three single phase voltages in 120° phase relation are developed, i.e. a three-phase voltage. The contacts 177, 178 and 179 are therefore connected to terminals 189, 190 and 191 forming the output terminals for the circuit. Such terminals may be connected to the terminals 134—136 of the circuit of Figure 3 or the terminals 168—170 of the circuit of Figure 4. If a neutral is desired, it is provided by a terminal 192 connected through resistors 193 and 194 of equal value to the opposite terminals of the battery 188.

The ganged contacts 177—179 are driven from a motor 195 through an adjustable ratio transmission unit 196 which may be of any of the forms well known in the art. The motor 195 may be a three-phase synchronous motor having a stator winding connected to terminals 197, 198 and 199 which may be connected to any suitable supply line such as the lines 25—27 of the system of Figure 1.

It will be readily appreciated that by adjustment of the transmission 196, any desired output frequency may be obtained.

This invention thus provides a paper-making machine drive system in which the optimum speed differential between sections is accurately maintained. The speed of all of the rolls can be simultaneously increased or decreased without using a cumbersome line shaft arrangement, and the use of separate drive motors provides flexibility and ease of installation and maintenance. There is a minimum waste of power and the system is highly efficient. The power demands upon and hence size of the adjustable low frequency sources is minimized, and the disclosed adjustable low frequency sources are readily constructed and reliable in operation. It will be apparent that the components of the system are of standard construction, or can be readily made by modification of standard components.

It will be understood that modifications and variations may be effected without departing from the spirit and scope of the novel concepts of the present invention.

I claim as my invention:

1. In an adjustable speed drive, a plurality of electric motors each having rotor and stator windings, means for connecting one winding of each motor to a main source of alternating current, a plurality of generators each of a direct current type having an armature rotating in a stationary field structure with a commutator rotating with the armature, a brush structure engaging each commutator and supported for rotation relative to the field structures, a plurality of control motors connected to said main source of alternating current and arranged for rotating said brush structures at relatively slow speeds, a plurality of slip ring means for connecting said brush structures to the others of said windings of said motor, and means adjusting the drive speed ratio between each of the control motors and the associated brush structure to control the relative speeds of the main motors.

2. In an adjustable speed drive, an electric motor having rotor and stator windings, means for connecting one of said windings to a main source of alternating current, a direct current type of generator having an armature rotating in a stationary field structure with a commutator rotating with the armature, brushes engaging said commutator, means for rotating said brushes relative to said field structure at a slow speed relative to the speed of rotation of said armature, slip ring means connecting said brushes to the other of said windings of said motor, and means for adjusting the speed of rotation of said brushes over a range such that a variable frequency current is developed in said other of said windings in a range of frequencies small compared to the frequency of said main source and having a maximum variation not exceeding 10% of the frequency of said main source.

3. In an electric motor drive system for driving an output shaft at any rotational speed in a certain range with electrical energization from a polyphase alternating current source of substantially fixed frequency, a polyphase electric motor having a rotor and a stator and polyphase rotor and stator windings, a fixed ratio mechanical drive coupling between said rotor and said output shaft, means connecting one of said windings to said source, excitation means arranged to develop a polyphase output voltage of controllable magnitude and frequency, means applying said output voltage to the other of said windings, means for controlling said frequency of said excitation means to control the speed of rotation of said output shaft, sensing means responsive to the current flow between said excitation means and said other of said windings, and means controlled by said sensing means and arranged to control said output voltage to maintain a substantially constant current flow between said excitation means and said other of said windings.

4. An electric motor drive system as defined in claim 3, wherein said excitation means includes a direct current type of generator having an armature rotating in a stationary field structure with a commutator rotating with the armature, brushes engaging said commutator, means for rotating said brushes relative to said field structure at a slow speed relative to the speed of rotation of said armature, and slip ring means connected to said brushes, wherein said frequency control means comprises means for adjusting the speed of rotation of said brushes, and wherein said means controlled by said sensing means and arranged to control said output voltage comprises a field winding in said stationary field structure.

5. An electric motor drive system as defined in claim 3, wherein said excitation means comprises a plurality of amplifier devices.

References Cited in the file of this patent

UNITED STATES PATENTS

| | | |
|---|---|---|
| 522,241 | Thompson | July 3, 1894 |
| 1,506,446 | Rogers | Aug. 26, 1924 |
| 1,581,949 | Horstkotte | Apr. 20, 1926 |